June 13, 1967     A. A. GLOWACZ     3,324,517

CABLE CONNECTOR

Filed Oct. 23, 1965

INVENTOR.
ANTHONY A. GLOWACZ
BY *Samuel Lindenberg*
*Abraham Wasserman*
ATTORNEYS

United States Patent Office 3,324,517
Patented June 13, 1967

3,324,517
CABLE CONNECTOR
Anthony A. Glowacz, Northridge, Calif., assignor to Viking Industries Inc., Northridge, Calif., a corporation of California
Filed Oct. 23, 1965, Ser. No. 503,877
7 Claims. (Cl. 24—122.6)

This invention relates to connectors and more particularly to an improved connector for a cable protected by an armor of a plurality of armor cables or wires.

Generally, cables which may be subjected to severe conditions are protected by an exterior armor of one or more layers of spirally wound armor wires. For example, cables of the multiconductor type in which a plurality of conductors are encased in an insulating material, used in marine applications, are protected by such layers of armor wires. The function of the armor wires is to protect the cable from forces which may otherwise damage the plurality of conductors.

The armor wires, though most useful, greatly increase the weight of the cable per unit of length. When very long cables are used, their total weight often presents difficult problems in pulling the cables to or from their operative locations. This problem is further complicated when the cables are to be pulled out of water or other media.

Accordingly, it is an object of the invention to provide a new cable connector.

Another object is the provision of a novel connector particularly adapted to be coupled to a cable with protective armor wires.

A further object is the provision of a relatively simple connector which is conveniently couplable to a multi-armor wire protected cable, whereby only the multi-armor wires are subjected to strain forces when the cable is pulled.

Still another object is to provide a novel and relatively inexpensive cable connector securable to a cable by the armor wires thereof to provide safe means for pulling the cable to any desired location.

Still a further object is the provision of a novel and simple connector for a cable with armor wires, whereby full breaking strength of the armor wires is developed due to the novel manner in which the wires are coupled to the connector.

Yet a further object is to provide a new connector which is couplable to armor wires of a cable in such a manner that by pulling the connector tensile forces are applied to each of the armor wires, thereby causing the cable to be pulled. With a greater number of armored wires, a greater load can be achieved, the armored wire load per wire being additive.

These and other objects of the invention are achieved by providing a cable connector which is couplable to the cable by the protective armor wires. Briefly, the connector includes a clevis-type member having a recess into which a plurality of sleeve-like members, each fastened to the end of another armor wire, are placed. The clevis-type member is connectable to any device for pulling the cable. As the clevis-type member is pulled, the sleeve-like members abut within the recess against it and in turn pull evenly on all the fastened armor wires. Thus, the cable is pulled by actually evenly pulling its protective armor wires, thereby developing full breaking strength thereof. Similarly, the clevis-type member after being fastened to the cable, may also be connected to any device or object. Then by pulling the cable, the device or object can be pulled from or to any desired location. Since the connector is connected only to the armor wires, when the cable is pulled only the armor wires rather than the multiconductors of the cable are subjected to strain forces.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
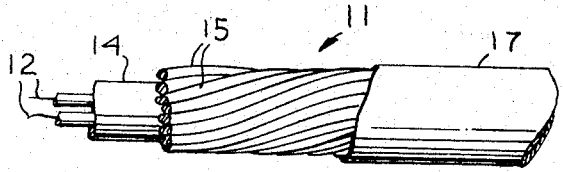
FIGURE 1 is a partial cross-sectional view of a multi-conductor cable with insulating armor wires.

Attention is first directed to FIGURE 1 wherein a cable 11 of the type couplable to the novel connector of the invention is shown comprising of one or more conductors 12 in a conductor insulating material 14. The cable 11 is protected by a plurality of armor wires 15 which are generally wound in a helical or spiral arrangement about the material 14. For some applications, the armor wires 15, which are made of metal material with high tensile strength, are covered by a cover material 17, such as plastic.

Figure 2:
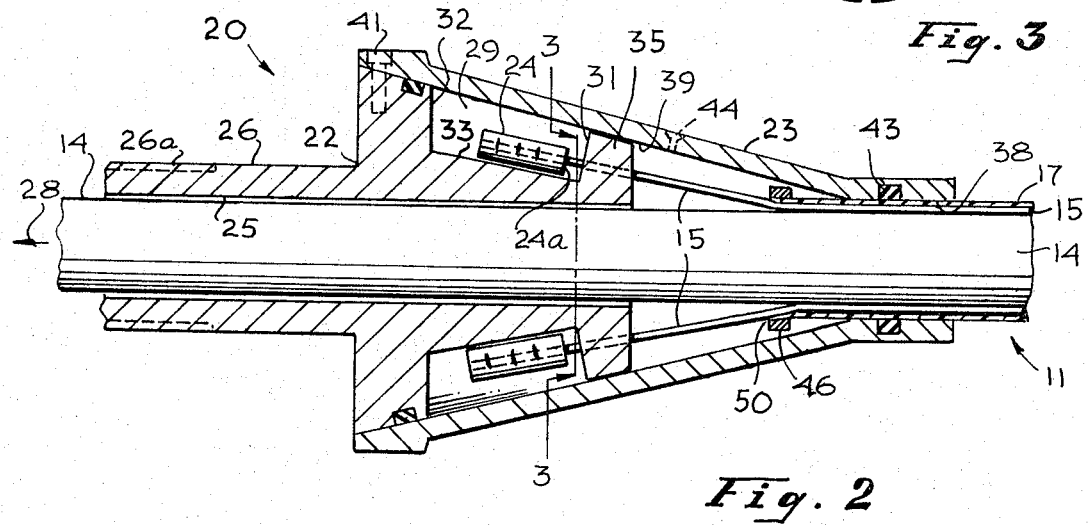
FIGURE 2 is a cross-sectional view of the novel cable connector of the present invention.

Referring to FIGURE 2, there is shown a cross-section of a cable connector 20 constructed in accordance with the teachings of the invention. Basically, the connector comprises of a clevis-type member 22, a cover 23, and a plurality of sleeve-like members 24. The clevis-type member 22 which is generally cylindrically shaped has a central opening 25 axially extending therethrough. The diameter of the opening is at least equal to the diameter of the conductor insulating material 14 of cable 11 to which the connector 20 is to be fastened.

The clevis-type member 22 may be thought of as comprising a neck 26 to which any fastening device may be coupled in order to pull the cable in the direction indicated by arrow 28. To this end, the neck portion 26 may be provided with threads 26a or include a plurality of apertures through which the connector 20 may be engaged with any pulling mechanism. The clevis-type member 22 is also characterized by a recess 29 having two side walls 31 and 32 and a bottom 33, the recess being preferably inclined with respect to the central axis of the connector 20.

Figure 3:
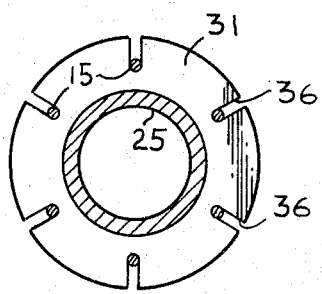
FIGURE 3 is a cross-sectional view along lines 3—3 shown in FIGURE 2.

In the end portion 35 of member 22 through side wall 31 are defined a plurality of slots 36 shown in FIGURE 3 which is a cross-sectional view along lines 3—3 of FIGURE 2. The slots 36 are wide enough to enable the insertion of armor wires 15 into the recess 29. Although in FIGURE 3 only six slots are shown, it should be appreciated that the number of slots is equal to the number of armor wires 15 protecting cable 11. Each armor wire 15 is fastened, such as by crimping, to another sleeve member 24 which is small enough so that all the sleeve members can be placed within the recess with each member being preferably supported by the recess bottom 33.

The connector 20 also includes the conically-shaped cover 23 which has a central opening 38 big enough for the cable 11 with the armor wires 15 to extend therethrough. The interior wall 39 of cover 23 is sloped so that when the cover is in position above the clevis-type member 22, the recess 29 is enclosed. The cover 23 may be fastened to the member 22 by means of screws 41 or any other retaining device such as a retention ring. Further, seals such as conventional O-rings 42 and 43 may be employed to prevent moisture or fluids from having free access to the recess 29, thereby reducing corrosion or deterioration of the sleeve members 24. Also if desired the cover 23 may include a potting aperture 44 through which a potting compound may be poured to permanently fill the space between member 22 and cover 23, thereby encasing the interior of the connector 20.

From the foregoing description and in particular FIGURE 2, it is seen that as the clevis-type member 22 is pulled in the direction of arrow 28, ends 24a of sleeve members 24 engage side wall 31. Thereafter as the members are engaged, each sleeve member enclosed within the recess 29 pulls its respective armor wire 15. Consequently, the cable 11 is pulled by the pulling forces applied to its armor wires. By controlling the length of each armor wire 15 from a fixed point defined by a ring 46 to end 24a of its respective sleeve member, an equal pulling force is applied to each armor wire, thus evenly distributing the tensile force applied to the cable 11.

From the foregoing, it is thus seen that in accordance with the teachings herein disclosed by using the novel cable connector, the cable 11 is pulled by applying pulling or tensile forces equally distributed among the plurality of the armor wires of the cable's armor. Consequently, full breaking strength of the armor wires may be developed with either static or dynamic loads.

In practice, when coupling the novel connector to a cable such as cable 11 (FIGURE 1), the exterior cover material 17 is first removed. Thereafter the cable 11 is inserted through the conically-shaped cover 23. The ring 46 is forced or fastened over the armor wires 15 to define a peripheral point 50 (see FIGURE 2). Then, each armor wire 15 is trimmed and fastened such as by crimping to its respective sleeve member 24. It is important that the length of each wire 15 from point 50 to end 24a of its respective sleeve member be substantially equal so that equal forces are applied to the various armor wires 15.

After fastening the sleeve members to wires 15, clevis-type member is inserted over the central portion 14 of cable 11. The sleeve members 24 are then placed in recess 29, each armor wire being insertable through another slot 36 (FIGURE 3). Finally, the cover 23 is positioned over and fastened to member 22 and the interior of the connector filled with a potting compound if desired.

From the foregoing, it should be appreciated that the novel connector is particularly adaptable to be coupled to the end or termination of a cable. However, the invention need not be limited thereto. Rather the connector can be used along any point of a long armor wire protected cable so long as the clevis-type member 22 and the conically-shaped cover 23 have openings big enough for the cable to extend therethrough. For example, a pair of cable connectors 50 and 55 may be fastened to a cable 60 at any point along its length by splicing the armor wires 62 thereof and coupling them to the connectors as herebefore described.

Figure 4:
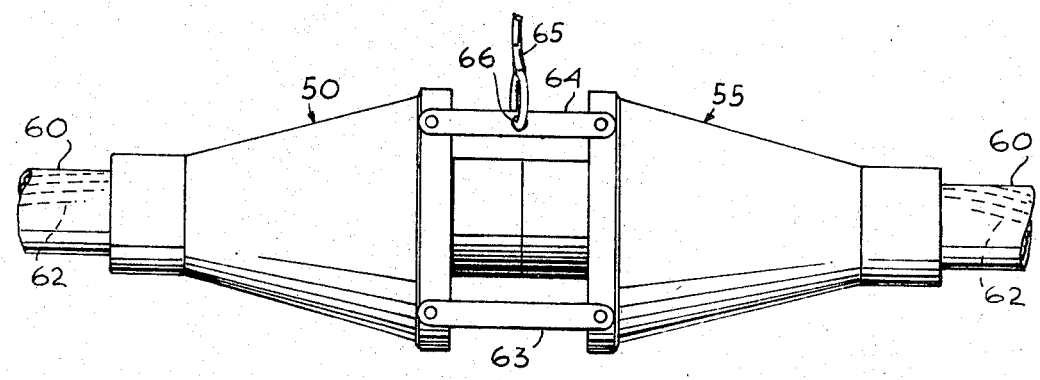
FIGURE 4 is a side view of an exemplary application of the novel cable connector.

The two connectors can then be integrally connected to one another by means of a bracket 63 (and/or bolts) and a bracket 64 to which a cable 65 is fastenable through an opening 66. The other end of cable 65 may be connected to a cable pulling mechanism (not shown) in order to raise or lower cable 60. Such an arrangement may be particularly useful in marine applications where long cables are submerged under water with a need often arising to raise certain portions of the cable above the water for maintenance and/or repairs. In addition, the two connector combination shown in FIGURE 4 may define an aperture through which may extend another multiconductor cable having its conductors electrically connected to the various conductors in cable 60. Alternatively, the two connector combination (FIGURE 4) may include an electrical outlet (not shown) to which the various conductors of cable 60 may be electrically connected. Thus, by connecting any testing equipment to the outlet, the signals in the conductors of cable 60 may be monitored and/or utilized for any desired purpose.

There has accordingly been shown and described herein a novel connector which is particularly adapted to be coupled to the armor wires conventionally wound about cables to protect them from severe damaging conditions. It is appreciated that those familiar with the art may make modifications in the arrangements as shown without departing from the true spirit of the invention. Therefore, all such modifications are deemed to fall within the scope of the invention without departing from the true scope of the invention.

What is claimed is:

1. A connector for a cable having a plurality of armor wires wound about a conductor carrying center member the connector comprising:
   a plurality of sleeve members each member being fastenable to the end of another of said armor wires;
   a clevis-type member having a first portion couplable to a cable pulling device and a second portion defining a recess about a portion of the periphery thereof, said recess being large enough for housing all of said plurality of sleeve members therein, said second portion further defining a plurality of slots, each extending from the end of said second portion to said recess, each slot being wide enough for extending one of said armor wires therethrough and place its respective sleeve member in said recess; and
   cover means for enclosing said plurality of sleeve members in said recess.

2. A connector as defined in claim 1 further including a fastening member fastened about said plurality of armor wires for defining a peripheral point to control the lengths of said armor wires from said peripheral point to their respective sleeve members to be equal whereby when said clevis-type member is pulled by a cable pulling device the sleeve members engage within said recess said second portion of said clevis-type member to pull the plurality of armor wires with a substantially uniform force.

3. A connector device as recited in claim 2 wherein said second portion of said clevis-type member has conically-shaped exterior and an axis along recess defined therein forms an angle with the longitudinal axis of said clevis-type member and the interior of said cover means is conically-shaped to engage the conically-shaped exterior of said clevis-type member and thereby enclose the recess therein.

4. A connector for a cable characterized by at least a central portion supporting one or more conductors and a plurality of armor wires wound about said central portion to protect the one or more conductors from adverse forces, the connector comprising:
   a plurality of sleeve members each member being fastenable to the end of another of said armor wires;
   a clevis-type member having cylindrical opening extending axially therethrough, the diameter of said opening being at least equal to the diameter of the central portion of said cable so as to insert said central portion therethrough, the exterior of said clevis-type member defining a neck-like portion adaptable to be coupled to a cable pulling device and a recess defining portion having a recess open on one side about its periphery, said recess defining portion further defining a plurality of slots extending from the end of said recess defining portion to said recess, each slot being wide enough for one of said armor wires to extend into said recess therethrough; and
   a cover member having a cylindrical central opening extending therethrough, the diameter thereof being substantially equal to the diameter of said cable with said armor wires wound thereabout so that said cable with said armor wires is extendable therethrough, said cover member having the interior thereof shaped to conform to the exterior of the recess defining portion of said clevis-type member to enclose said plurality of sleeve members in said recess.

5. A connector as recited in claim 4 wherein the exterior of said recess defining portion is conically shaped the longitudinal axis of said recess forming an angle with an axis along the aperture extending through said clevis-type member, and the interior of said cover member is conically shaped to conform to the exterior of said recess defining portion.

6. A connector as recited in claim 5 further including means for sealing the space between the exterior of said recess defining portion and the interior of said cover member to prevent the access of liquid therethrough.

7. A connector as recited in claim 5 further including means fastened to said cable about said armor wires to define a peripheral point to control the length of each armor wire from said point to its respective sleeve member to equal the lengths of other armor wires, whereby a uniform pulling force is applied to all of said armor wires when the neck portion of said clevis-type member is pulled by a cable pulling device.

References Cited

UNITED STATES PATENTS

| | | |
|---|---|---|
| 652,617 | 6/1900 | Hotz. |
| 3,294,053 | 12/1966 | Emery. |

FOREIGN PATENTS

| | | |
|---|---|---|
| 195,081 | 1/1958 | Austria. |
| 221,264 | 5/1962 | Austria. |

BERNARD A. GELAK, *Primary Examiner.*